(12) United States Patent
Sweed

(10) Patent No.: US 6,377,242 B1
(45) Date of Patent: Apr. 23, 2002

(54) DISPLAY POINTER TRACKING DEVICE

(75) Inventor: Richard H. Sweed, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/453,258

(22) Filed: Dec. 2, 1999

(51) Int. Cl.$^7$ .................................................. G09G 5/08
(52) U.S. Cl. ...................................... 345/158; 345/157
(58) Field of Search ................................ 345/156, 157, 345/158, 169, 159, 160, 161, 162, 163, 173, 179, 180, 181, 182, 183

(56) References Cited

U.S. PATENT DOCUMENTS

| | | | | |
|---|---|---|---|---|
| 3,885,096 A | * | 5/1975 | Inuiya ........................ 345/158 |
| 5,115,230 A | * | 5/1992 | Smoot ........................ 345/158 |
| 5,181,015 A | * | 1/1993 | Marshall et al. ............ 345/158 |
| 5,502,459 A | * | 3/1996 | Marshall et al. ............ 345/158 |
| 5,504,501 A | * | 4/1996 | Hauck et al. ............... 345/158 |
| 5,515,079 A | * | 5/1996 | Hauck ........................ 345/158 |
| 5,594,468 A | * | 1/1997 | Marshall et al. ............ 345/158 |
| 5,682,181 A | * | 10/1997 | Nguyen et al. ............. 345/158 |

* cited by examiner

Primary Examiner—Xiao Wu
(74) Attorney, Agent, or Firm—Harold L. Burstyn; Joseph A. Mancini

(57) ABSTRACT

A device for tracking a light pointer on a display. The device processes analog interlaced field video images from a video camera, seeking the point of brightest intensity, which is the current location of the pointer on the display. Synchronously operating counters and a latch count the lines and pixels of the video data until a high-speed comparator detects the brightest point of the video data. The comparator then sends a detect signal, causing control logic to freeze the counters, as well as freezing the latch, effectively storing in the counters and latch the line and pixel location of the pointer. The same detect signal from the comparator instructs a microcontroller to output the data from the counters in computer readable, digital data format. The device operates in substantially real time in either two or three-dimensional space, with greater speed and significantly reduced cost over the prior art, and an adjustable resolution.

17 Claims, 3 Drawing Sheets

DISPLAY POINTER TRACKING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to the field of person-machine interfaces; specifically, it relates to the field of tracking-pointer devices. The present invention improves tracking a light pointer on any type of display.

The prior-art tracking device used with large-scale or group displays employs a computer that analyzes the display and determines the location of a user-operated pointer that interacts with the display. The pointer is typically a battery-operated light or laser pen that illuminates an element of the display. A video camera trained on the display transmits its image to a computer. The computer analyzes the image frame by frame to determine the current position of the pointer on the display.

This prior-art device uses software and a video capture card in a PC to analyze the video. The video capture card creates a bitmap of the display that the software searches for the brightest isolated spot. Once the software finds this spot, it records its coordinates, which correspond to the location of the spot. The video capture card accepts data from a video camera one frame at a time. In the prior-art device, the PC must process the entire captured video bitmap using software. As such, the rate at which the prior-art device can operate equals the sum of the time required to capture the video, the time for the software to run through its sequence, and the time associated with the inherent processing speed of the PC. As an example, a prior-art device based on a 200 MHz Pentium PC will produce pointer coordinates from the corresponding video frame bitmaps at a rate of 15 per second. A computer system can use the coordinates provided by the prior-art-tracking device in a number of ways; the most common is to treat the pointer like a mouse.

This prior-art device suffers several limitations. It cannot operate in real time, as searching for the bright spot cannot begin until the capture card has loaded an entire frame of video. The built-in delay is therefore never less than the time required to completely search a given frame. The prior-art device is also limited in both resolution and update rate, which depend on the processing power available. A minimally acceptable 240×320-pixel image at 15 frames/second fully consumes the resources of the example 200 MHz Pentium PC. Lastly, even a minimal system of the prior art can cost several thousand dollars.

Thus there is a need for a system that tracks the pointer of any two- or three-dimensional display in real time with high resolution, rapid update, and at lower cost than the devices presently available.

OBJECTS AND SUMMARY OF THE INVENTION

An object of this invention is to track a pointer on a display in real time.

Another object of the present invention is to operate in both two- and three-dimensional space.

Still another object of the present invention is to track a pointer on a display with a camera resolution greater than 240×320 pixels and at a rate faster than 15 frames per second.

Yet another object of this invention is to track a pointer across a single display or across multiple displays.

The present invention performs these tasks at a great reduction in cost from prior-art devices. The present invention addresses the limitations of the prior art by eliminating the computer from the system, replacing it with custom hardware that functions in substantially real time in both two- and three-dimensional space with readily expandable resolution. Construction costs are a fraction of those for a prior-art computer-based device.

The present invention improves tracking a user-operated light pointer on any type of display by combining a microcontroller, video processing logic, a pair of counters and a latch, and real-time control logic that together track the pointer image. A camera on the display sends video data to the device of the present invention, which looks for the point of greatest intensity in the video. This point corresponds to the location of the pointer. Two counters and a latch store the current location of the pointer's image on the display. One counter holds the pixel location, the other counter holds the line location, and the latch holds the value of the field, odd or even. Timing information, input along with the video, controls the counters and latch. Changing the resolution of the device requires extending each counter in bits and making the clock run faster. When the pointer is located in the video, the counters and latch are stopped and their values provided to the system in substantially real time via the microcontroller.

A comparison between the present invention and a prior-art device based on a 200 MHz Pentium PC demonstrated the several advantages of the present invention:

First, speed: The present invention easily detects the pointer each time the video scans the pointer. The prior-art device can maintain consistently a detection rate of only 20–25% of the scan.

Second, timeliness: The present invention begins to report detection almost immediately after the video processor "sees" the pointer. The prior-art device must always complete a fall frame before it can begin its search for the pointer.

Third, resolution: To sustain a 10–15 Hz update rate, the prior-art device is limited to a resolution of 240×320 pixels. The present invention currently operates at 480×512 pixels. Its resolution can be increased without penalty to any practical value. Only the type of camera limits the maximum resolution.

Fourth, technical obsolescence: The prior-art device is limited to use with analog-only cameras as a result of its dependency on the video capture card. The present invention is not so limited; it can capitalize on the recent proliferation of compact digital video cameras that have analog outputs, digital outputs, or both.

Fifth, cost: The present invention costs less than $150. The prior-art device costs in excess of $2,500.

Briefly stated, the present invention provides apparatus and method to track a light pointer on a display. The device processes analog interlaced field video images from a video camera, seeking the point of brightest intensity, which is the current location of the pointer on the display. Synchronously operating counters and a latch count the lines and pixels of the video data until a high-speed comparator detects the brightest point of the video data. The comparator then sends a detect signal, causing control logic to freeze the counters, as well as freezing the latch, effectively storing in the counters and latch the line and pixel location of the pointer. The same detect signal from the comparator instructs a microcontroller to output the data from the counters in various digital data formats, one such being RS 232. The device operates in substantially real time in either two or three-dimensional space, with greater speed and significantly reduced cost over the prior art, and an adjustable resolution.

According to an embodiment of the invention, an electronic tracking device whose output is absolute x and y coordinates of a light pointer's image on a display and synchronization information, comprises: a microcontroller; video-processing logic; two synchronized counters; a latch; and control logic.

According to a feature of the invention, a method of tracking a user-operated light pointer on a passive or active single display, or passive or active multiple displays, comprises the steps of: simultaneously inputting frames of video to a tracking device, the frames of video comprising interleaved fields; detecting the light pointer's image on the display; counting lines and pixels in the frames of video until the pointer's image is detected; determining and storing a value of a current one of the interleaved fields, the value being odd or even, until the pointer's image is detected; stopping counting the lines and the pixels when the pointer's image is detected; producing a position of the pointer's image, the position comprising absolute x and y coordinates of the position and a synchronization bit; and resetting the step of counting to minimum values after the step of producing.

According to another feature of the invention, apparatus for tracking a user-operated light pointer on a passive or active single display, or passive or active multiple displays, comprises: means for simultaneously inputting frames of video to a tracking device, the frames of video comprising interleaved fields; means for detecting the light pointer's image on the display; means for counting lines and pixels in the frames of video until the pointer's image is detected; means for determining and storing a value of a current one of the interleaved fields, the value being odd or even, until the pointer's image is detected; means for stopping counting the lines and the pixels when the pointer's image is detected; means for producing a position of the pointer's image, the position comprising absolute x and y coordinates of the position and a synchronization bit; and means for resetting the means for counting to minimum values after the means for producing has produced the position.

The above and other objects, features, and advantages of the present invention will become apparent from the following description read in conjunction with the accompanying drawings, in which like reference numerals designate the same elements.

DETAILED DESCRIPTION OF THE PREFERRED EMBODIMENT

Figure 1:
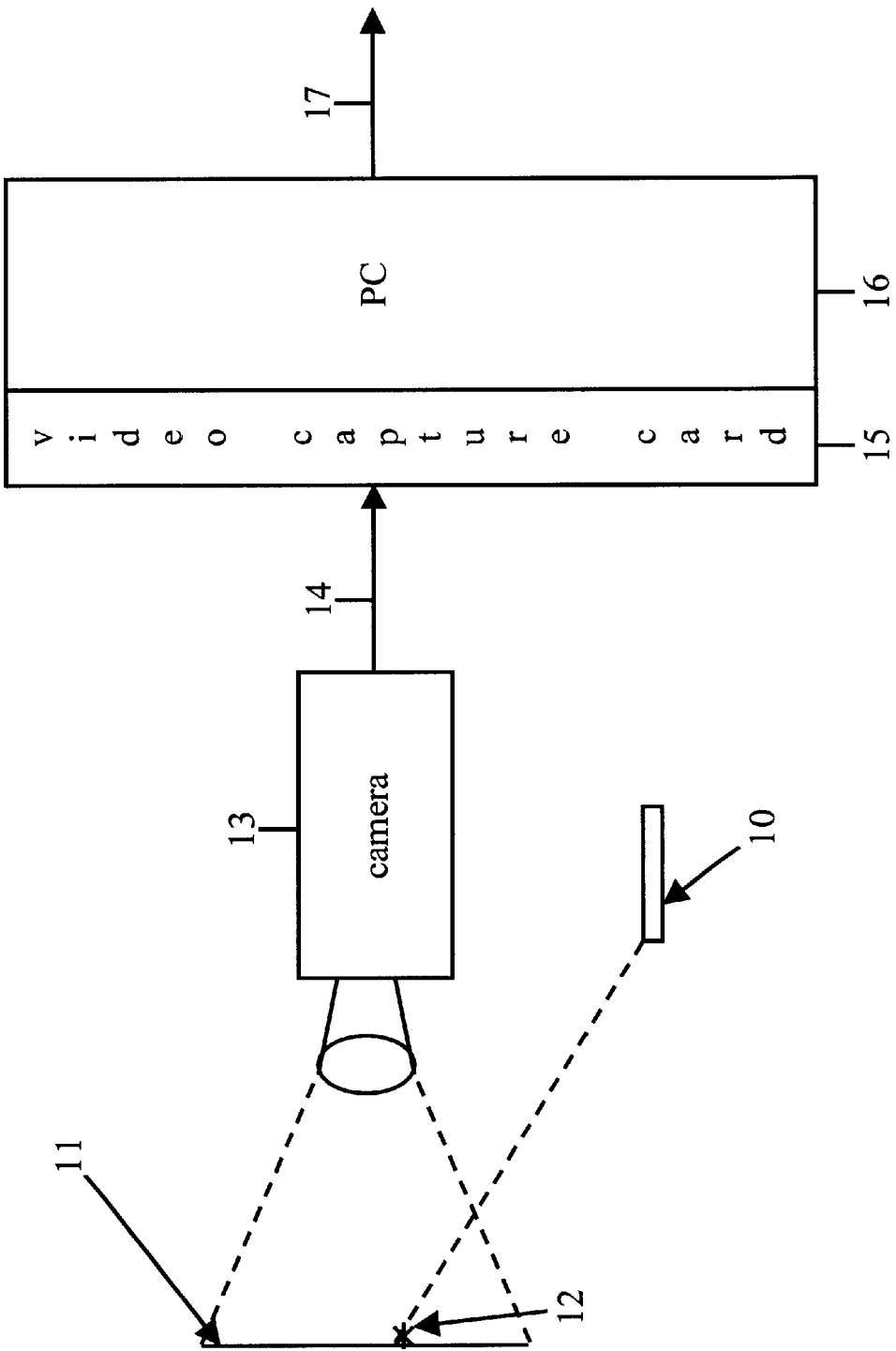
FIG. 1 shows the prior-art tracking-device tracking a user-operated pointer on a display screen.

Referring to FIG. 1, a camera 13 looks at a display 11, such as a screen, a map, a three-dimensional space, or any image. Camera 13 produces a camera video signal 14 that is the display with a pointer image 12 generated by a pointer 10 operated by a user. A video capture card 15 takes camera video signal 14 as input to a personal computer ("PC") 16. PC 16 processes camera video signal 14 to find the location of pointer image 12. PC 16 outputs this data in RS 232 serial format with a resolution of 240×320 pixels and a maximum update rate of 15 Hz as an RS 232 position data-out signal 17.

Figure 2:
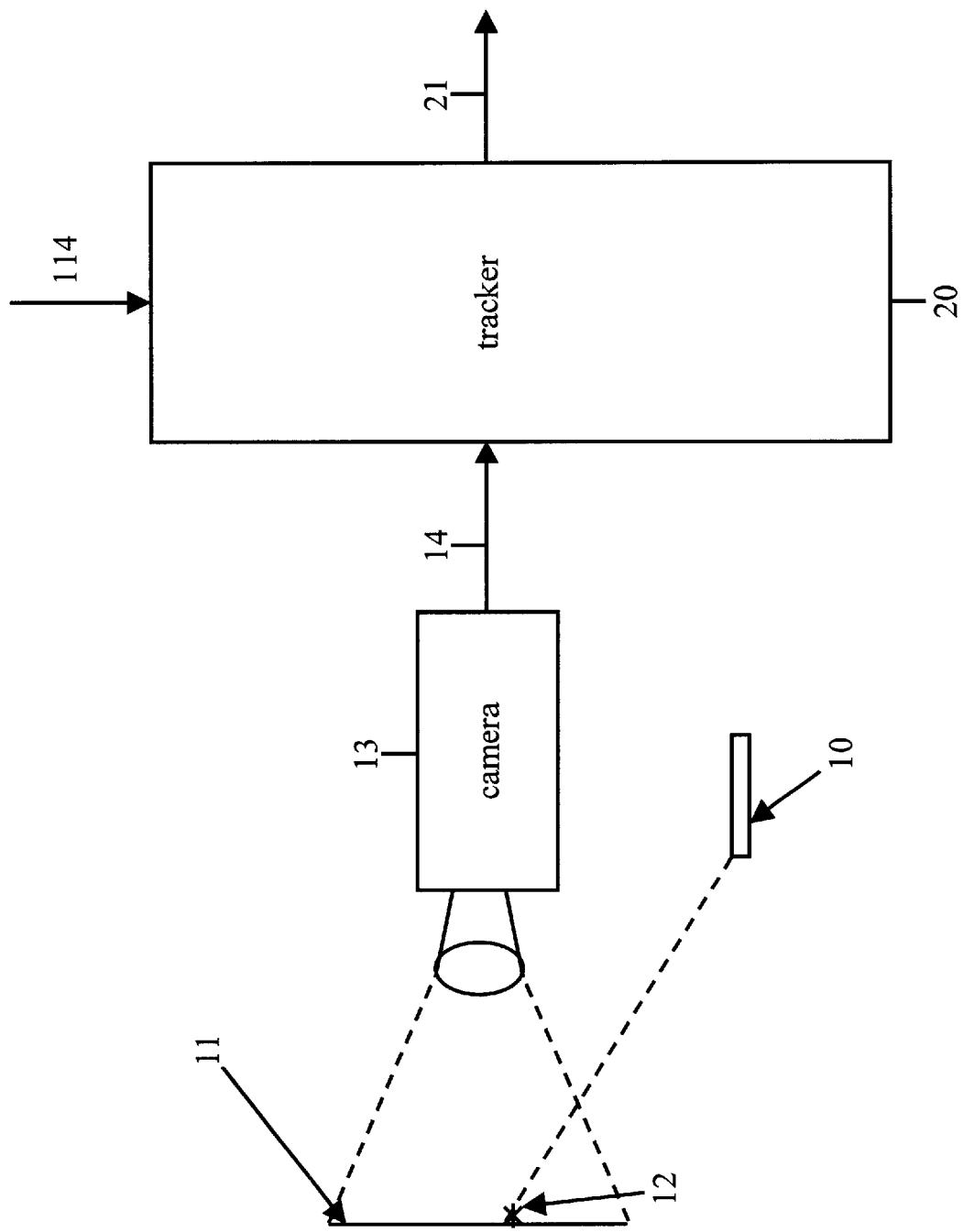
FIG. 2 shows the present invention tracking a user-operated pointer on a display screen.

Referring to FIG. 2, the present invention has a tracker 20 that replaces video capture card 15 and PC 16. To operate, tracker 20 requires a reference level 114, and camera video signal 14. Reference level 114 is simply a stable DC voltage, adjusted by an internal potentiometer to which external access is provided. Tracker 20 produces an RS 232 serial output signal 21, similar to RS 232 position data-out signal 17, but with a higher update rate of 60 Hz and a higher resolution of 480×512 pixels.

Figure 3:
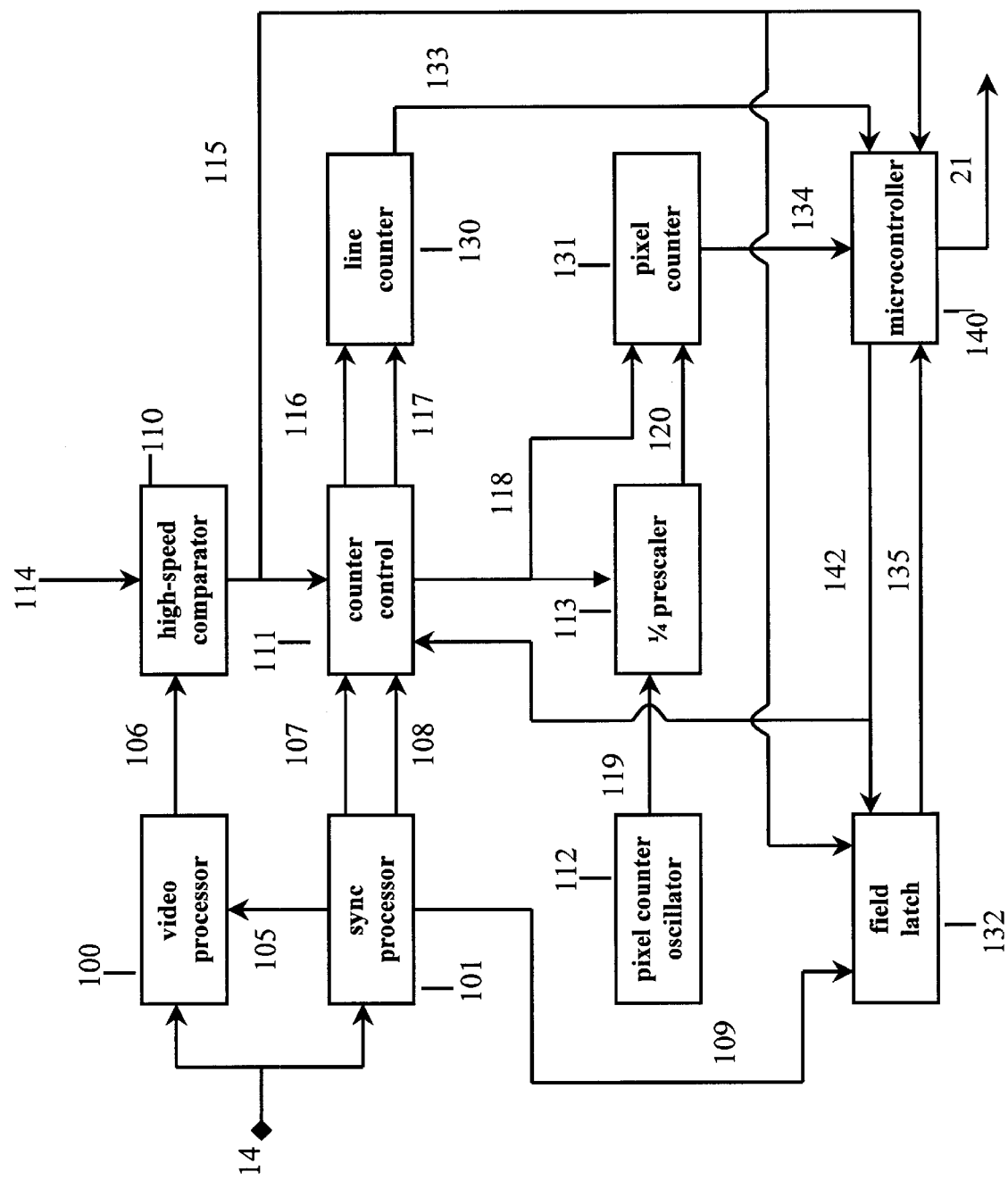
FIG. 3 is a block diagram of the display pointer-tracking device of the present invention.

Referring to FIG. 3, within tracker 20, a microcontroller 140; a video processor 100, and a sync processor 101; a line counter 130, a pixel counter 131, and a field latch 132; and real-time control logic comprising a high-speed comparator 110, a counter control 111, a pixel counter oscillator 112, and a prescaler 113 together track pointer image 12 of pointer 10 (see FIG. 2).

Line counter 130 and pixel counter 131, which are synchronized, follow camera video signal 14. When camera 13 "sees" pointer 10 (see FIG. 2), line counter 130 and pixel counter 131 each contain one of a pair of values, eight line bits 133 and nine pixel bits 134, and field latch 132 contains field bit 135, the least significant bit of line counter 130. These together represent pointer 10's position on display 11's surface. The device then passes eight line bits 133, field bit 135, and nine pixel bits 134 to the using system in substantially real time.

Camera video signal 14 contains pointer image 12 as well as synchronization data used for timing. Camera video signal 14 is initially applied to two analog components, video processor 100 and sync processor 101.

Video processor 100 performs three operations on camera video signal 14. First, video processor 100 gives camera video signal 14 a fixed DC reference level or clamp signal 105. Clamp signal 105 stabilizes camera video signal 14 for high-speed comparator 110. Video processor 100 provides external potentiometer adjustments to set an internal gain signal reference voltage 103 and an internal offset signal reference voltage 104 to maximize the sensitivity of high-speed comparator 110. Finally, video processor 100 removes the synchronization data from camera video signal 14, as they are extraneous to the operations that follow.

Video processor 100 sends a video processor output signal 106 to high-speed comparator 110 to be matched to adjustable reference level 114. High-speed comparator 110 is adjusted so that video processor output signal 106, when it contains pointer image 12, will exceed adjustable reference level 114, thereby producing a detect signal 115 for counter control 111 and field latch 132. Detect signal 115 also goes to microcontroller 140 to alert it when high-speed comparator 110 detects pointer 10.

Camera video signal 14 is simultaneously applied to sync processor 101, which extracts the timing data after stripping the video component. Sync processor 101 also provides video processor 100 with a clamp signal 105. To delineate the start of each line and field, sync processor 101 produces an H sync signal 107 and a V sync signal 108. As the present invention employs interlaced scanning, sync processor 101 also produces an odd/even field indicator signal 109.

Counter control 111 is the portion of the overall control structure that operates in real time and coordinates among H sync signal 107, V sync signal 108, detect signal 115, and line counter 130 and pixel counter 131 that track the vertical (line) and horizontal (pixel) position of the scan. Counter control 111 also controls line counter 130, pixel counter 131, and field latch 132 to latch the scan position when high-speed comparator 110 detects pointer 10.

Counter control 111 combines H sync signal 107 and V sync signal 108 from sync processor 101. A line-load control signal 116 presets line counter 130 at the beginning of each field. A line count control signal 117 triggers line counter 130 so that it counts only the active screen lines of camera video signal 14 and dismisses the vertical blanking interval from the count.

To simplify construction and retain resolution, the gating of pixel counter oscillator 112 should occur at a minimum of four times the actual pixel count. Pixel counter oscillator 112 produces a 20 MHz oscillating signal 119. Prescaler 113 takes this signal and produces a pixel count signal 120 for the clock of pixel counter 131, that is, 5 MHz. Pixel count signal 120 allows pixel counter 131 to follow the active portion of each scan line horizontally across the video image. Thus, the present invention maintains a minimum of +/− one-quarter pixel accuracy without requiring a phase-locked loop, as any jitter is less than one-quarter pixel error. Reducing the magnitude of the pixel error to less than one quarter enhances resolution. Setting prescaler 113's dividing ratio to less than one-quarter gives a pixel error of less than one-quarter. Counter control 111 also controls pixel counter 131 via a pixel count control signal 118 to either hold the current value or reset.

Field latch 132 keeps track of whether the current field is odd or even, receiving this information via odd/even field indicator signal 109 from sync processor 101.

If high-speed comparator 110 does not detect pointer 10, both line counter 130 and pixel counter 131 run to their maximum count, reset, and repeat the sequence.

If, however, detection occurs, high-speed comparator 110 signals counter control 111 and microcontroller 140 via detect signal 115 that data is available for output. Counter control 111 freezes line counter 130 and pixel counter 131, holding them at values that represent pointer 10's position. Detect signal 115 also stops field latch 132, holding it at the value of the current field. Microcontroller 140 reads and stores eight line bits 133, nine pixel bits 134, and field bit 135. Microcontroller 140 then issues a reset signal 142 to counter control 111 and field latch 132 so the process will restart synchronously with the beginning of the next camera scan.

Microcontroller 140 then repackages nine pixel bits 134, eight line bits 133, and field bit 135 (the least significant bit of the line count), adding a synchronization bit and forming them into a byte string or data frame. Microcontroller 140 outputs the data, at 9600 baud with no parity bits and one stop bit, as a digital data output signal. This particular embodiment outputs RS 232 serial output signal 21. Adapting the instructions of microcontroller 140 allows other formats and rates.

Although the present invention initially tracked the position of a laser pointer on a rear-projection video display, it can easily be adjusted to scan any user-operated pointer image on any projection (rear or front) or a non-projection direct-view display, including printed material such as a map. Further, passive, non-radiating displays as well as active, self-radiating displays may be employed, upon which a laser pointer may likewise be tracked. The tracked pointer can be used similarly to a mouse. However, the present invention locates the pointer in absolute coordinates, as opposed to relative coordinates as in the case of a mouse. Thus, in addition to being tracked anywhere on the display, the present invention can also automatically place the pointer anywhere on the display corresponding to the absolute coordinates of the desired location. In this mode, the present invention allows the pointer to actively convey information as it automatically moves about a display. The mouse, in contrast, is exclusively limited to manual placement by hand, which produces no information. As such, the utility of this feature of the present invention far exceeds the mere display-manipulating function of the mouse.

In addition, the present invention can operate in three-dimensional space as well as two-dimensional space. If the camera looked into a room, for example, and a user-operated pointer pointed at a clock on the wall, the present invention could still track the pointer. The output would be the location of the pointer in the room in absolute two-dimensional coordinates according to the camera. The user would then need to take the data and map the pointer's coordinates back to the three-dimensional space of the room.

Finally, the invention lends itself well to multiple panel displays. A single device can track a pointer across multiple panel displays, through a single camera that provides video for all panel displays at once. The resolution of the camera and the width of the panel displays are the only limits on the resolution and capacity of the present invention. An alternate result uses one device, and thus one camera, per panel display, as cost and complexity scale linearly.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electronic tracking device whose output is absolute x and y coordinates of a light pointer's image on a display and synchronization information, said device comprises:
   a microcontroller;
   video-processing logic,
      wherein said video processing logic further comprises:
      a processor for video data, and
      a processor for timing data;
   two synchronized counters;
   a latch;
   control logic,
      wherein said control logic further comprises:
      a high-speed comparator, and
      an oscillator;
      a counter control; and
      a prescaler,
         wherein said prescaler has a dividing ratio greater than zero but not greater than one-quarter.

2. The device as in claim 1, wherein said oscillator and said prescaler are replaced by an oscillator phase-locked to a video input horizontal synchronization signal.

3. The device as in claim 1, wherein said display is a one of an interactive display and a non-interactive display.

4. The device as in claim 1, wherein said display is a one of a two-dimensional display and a three-dimensional display.

5. The device as in claim 1, wherein said display is a one of a passive, non-radiating display and an active, self-radiating display.

6. The device as in claim 1, wherein said device tracks said image on a single display.

7. The device as in claim 1, wherein said device tracks said image on multiple displays.

8. A method for tracking a user-operated light pointer on a passive or active single display or passive or active multiple displays, comprising the steps of:
  simultaneously inputting frames of video to a tracking device, said frames of video comprising interleaved fields;
  detecting said light pointer's image on said display;
  counting lines and pixels in said frames of video until said pointer's image is detected, wherein said step of counting further comprises:
    prescaling said step of counting, said step of prescaling further comprising:
      producing an oscillating signal for enabling said step of prescaling said step of counting, and dividing said oscillating signal by a number not less than four;
  determining and storing a value of a current one of said interleaved fields, said value being odd or even, until said pointer's image is detected;
  stopping counting said lines and said pixels when said pointer's image is detected;
  producing a position of said pointer's image, said position comprising absolute x and y coordinates of said position and a synchronization bit; and
  resetting said step of counting to minimum values after said step of producing.

9. The method of claim 8, wherein said step of inputting frames of video further comprises the steps of:
  removing synchronization data from said frames of video;
  producing, by said step of removing synchronization data, a signal of video-only data from said frames of video; and
  adding a clamp signal, gain, and offset to said video-only data.

10. The method of claim 9 further comprising the steps of:
  removing video data from said frames of video;
  producing, by said step of removing video data, a signal of timing-only data from said frames of video; and
  producing delineation signals, comprising said timing-only data, to delineate a start of each line of said frames of video.

11. The method of claim 10 further comprising the steps of:
  comparing said video-only data with an external, stable DC voltage; and
  producing a detect signal said step of comparing.

12. The method of claim 8 further comprising the step of producing an oscillating signal for performing said step of counting.

13. The method of claim 12 further comprising the steps of:
  setting a number of lines and a number of pixels based on delineation signals; and
  repeating said step of counting when said pointer's image is not detected.

14. The method of claim 8, further comprising the step of packaging said position in a digital data format.

15. Apparatus for tracking a user-operated light pointer on a passive or active single display or passive or active multiple displays, said apparatus comprising:
  means for simultaneously inputting frames of video to a tracking device, said frames of video comprising interleaved fields;
  means for detecting said light pointer's image on said display;
  means for counting lines and pixels in said frames of video until said pointer's image is detected,
    wherein said means for counting further comprises:
      means for prescaling said means for counting, said means for prescaling further comprising:
        means for producing an oscillating signal to enable said means for prescaling said means for counting, and
        means for dividing said oscillating signal by a number not less than four;
  means for determining and storing a value of a current one of said interleaved fields, said value being odd or even, until said pointer's image is detected;
  means for stopping counting said lines and said pixels when said pointer's image is detected;
  means for producing a position of said pointer's image, said position comprising absolute x and y coordinates of said position and a synchronization bit; and
  means for resetting said means for counting to minimum values after said means for producing has produced said position.

16. Apparatus as in claim 15, wherein said means for simultaneously inputting frames of video further comprises:
  means for removing synchronization data from said frames of video;
  means for producing, by said means for removing, a signal of video-only data from said frames of video; and
  means for adding a clamp signal, gain, and offset to said video-only data.

17. Apparatus as in claim 16, further comprising means for removing video data from said frames of video;
  means for producing, by said means for removing video data, a signal of timing-only data from said frames of video; and
  means for producing delineation signals, comprising said timing-only data, to delineate a start of each line of said frames of video.

* * * * *